United States Patent
Cagle

(10) Patent No.: US 10,362,779 B2
(45) Date of Patent: Jul. 30, 2019

(54) FOWL DECOY MOVEMENT SIMULATOR

(71) Applicant: Samuel D. Cagle, Mequon, WI (US)

(72) Inventor: Samuel D. Cagle, Mequon, WI (US)

( * ) Notice: Subject to any disclaimer, the term of this patent is extended or adjusted under 35 U.S.C. 154(b) by 101 days.

(21) Appl. No.: 15/437,577

(22) Filed: Feb. 21, 2017

(65) Prior Publication Data

US 2017/0238530 A1    Aug. 24, 2017

Related U.S. Application Data

(60) Provisional application No. 62/297,939, filed on Feb. 21, 2016.

(51) Int. Cl.
*A01M 31/06* (2006.01)
*G08C 17/02* (2006.01)

(52) U.S. Cl.
CPC ........... *A01M 31/06* (2013.01); *G08C 17/02* (2013.01)

(58) Field of Classification Search
CPC .................................................. A01M 31/06
USPC ........................................................ 43/2, 3
See application file for complete search history.

(56) References Cited

U.S. PATENT DOCUMENTS

| | | | | |
|---|---|---|---|---|
| 740,293 A * | 9/1903 | Loeble | .................. | A01M 31/06 43/3 |
| 843,588 A * | 2/1907 | Ditto | ..................... | A01M 31/06 43/3 |
| 1,831,286 A * | 11/1931 | Chelini | .................. | A01M 31/06 43/3 |
| 2,434,335 A * | 1/1948 | Signalness | ............ | A01M 31/06 43/3 |
| 2,457,295 A * | 12/1948 | Woodhead | ............ | A01M 31/06 43/3 |
| 2,536,736 A * | 1/1951 | Gazalski | .................. | F24F 11/89 43/3 |
| 2,663,108 A * | 12/1953 | Dixon | .................... | A01M 31/06 43/3 |
| 2,691,233 A * | 10/1954 | Richardson | ........... | A01M 31/06 43/3 |
| 2,752,715 A * | 7/1956 | Miller | .................... | A01M 31/06 43/3 |
| 2,787,074 A * | 4/1957 | Miller | .................... | A01M 31/06 43/3 |

(Continued)

FOREIGN PATENT DOCUMENTS

| CA | 2921853 A1 * | 9/2016 | ............ A01M 31/06 |
|---|---|---|---|
| FR | 1008295 A * | 5/1952 | ............ A01M 31/06 |

(Continued)

OTHER PUBLICATIONS

Avian-X Lifeline 360 by Zink; http://www.gandermountain.com/modperl/product/details.cgi?i=436825 (Feb. 4, 2016).

*Primary Examiner* — Darren W Ark
(74) *Attorney, Agent, or Firm* — Rathe Lindenbaum LLP

(57) ABSTRACT

A decoy may include a ground support comprising a ground engaging portion and an upstanding post, a powered actuator operably coupled to the decoy and a wireless communications device. The wireless communications device may include a transmitter to transmit signals to a receiver in communication with the powered actuator, wherein the powered actuator selectively raises and lowers the decoy in response to receipt of the signals received by the receiver.

17 Claims, 11 Drawing Sheets

(56) References Cited

U.S. PATENT DOCUMENTS

| | | | | |
|---|---|---|---|---|
| 2,849,823 A * | 9/1958 | Miller | A01M 31/06 | 43/3 |
| 3,710,506 A * | 1/1973 | Thornell | A63H 3/36 | 446/190 |
| 3,844,061 A * | 10/1974 | Goldfarb | A63H 13/04 | 446/117 |
| 4,965,953 A * | 10/1990 | McKinney | A01M 31/06 | 43/2 |
| 5,036,614 A * | 8/1991 | Jackson | A01M 31/06 | 43/3 |
| 5,168,649 A * | 12/1992 | Wright | A01M 31/06 | 43/2 |
| 5,274,942 A * | 1/1994 | Lanius | A01M 31/06 | 43/2 |
| 5,375,363 A * | 12/1994 | Higdon | A01M 31/06 | 43/3 |
| 5,459,958 A * | 10/1995 | Reinke | A01M 31/06 | 43/2 |
| 5,515,637 A * | 5/1996 | Johnson | A01M 31/06 | 43/2 |
| 5,636,466 A * | 6/1997 | Davis | A01M 31/06 | 43/3 |
| 5,974,720 A * | 11/1999 | Bowling | A01M 31/06 | 43/2 |
| 6,021,594 A * | 2/2000 | Krueger | A01M 31/06 | 43/2 |
| 6,092,322 A * | 7/2000 | Samaras | A01M 31/06 | 43/2 |
| 6,216,382 B1 * | 4/2001 | Lindaman | A01M 31/06 | 248/156 |
| 6,574,902 B1 * | 6/2003 | Conger | A01M 31/06 | 43/2 |
| 6,775,943 B2 * | 8/2004 | Loughman | A01M 31/06 | 43/2 |
| 7,272,905 B1 * | 9/2007 | Horton | A01M 31/06 | 43/2 |
| 7,562,487 B2 * | 7/2009 | Barr | A01M 31/06 | 43/2 |
| 7,703,233 B2 * | 4/2010 | Zink, Jr. | A01M 31/06 | 43/2 |
| 8,082,690 B2 * | 12/2011 | Zink, Jr. | A01M 31/06 | 43/3 |
| 8,769,860 B2 * | 7/2014 | Bain | A01M 31/06 | 43/2 |
| 9,044,006 B1 * | 6/2015 | O'Neil | A01M 31/06 | |
| 9,826,731 B2 * | 11/2017 | Cagle | A01M 31/06 | |
| 9,968,081 B2 * | 5/2018 | Shea | A01M 31/06 | |
| 2002/0100206 A1 * | 8/2002 | Brint | A01M 31/06 | 43/2 |
| 2005/0132632 A1 * | 6/2005 | Fisher | A01M 31/06 | 43/3 |
| 2006/0053675 A1 * | 3/2006 | Lindaman | A01M 31/06 | 43/2 |
| 2006/0143969 A1 * | 7/2006 | Lindaman | A01M 31/06 | 43/2 |
| 2006/0143970 A1 * | 7/2006 | Lindaman | A01M 31/06 | 43/2 |
| 2006/0207158 A1 * | 9/2006 | Brewer | A01M 31/06 | 43/3 |
| 2007/0251135 A1 * | 11/2007 | Watlov | A01M 31/06 | 43/3 |
| 2008/0029659 A1 * | 2/2008 | Weber | A01M 31/06 | 248/156 |
| 2009/0007479 A1 * | 1/2009 | Jerome, Sr. | A01M 31/06 | 43/2 |
| 2009/0249678 A1 * | 10/2009 | Arnold | A01M 31/06 | 43/2 |
| 2010/0064569 A1 * | 3/2010 | Wyant | A01M 31/06 | 43/2 |
| 2011/0023349 A1 * | 2/2011 | Hughes | A01M 31/06 | 43/3 |
| 2011/0232153 A1 * | 9/2011 | Jennings, Jr. | A01M 31/06 | 43/2 |
| 2012/0042561 A1 * | 2/2012 | Bain | A01M 31/06 | 43/3 |
| 2013/0291422 A1 * | 11/2013 | Beal | A01M 31/06 | 43/2 |
| 2015/0208641 A1 * | 7/2015 | Gurner, III | A01M 31/06 | 43/2 |
| 2016/0309705 A1 * | 10/2016 | Johnson | A01M 31/06 | |
| 2017/0006855 A1 * | 1/2017 | Wessel | A01M 31/06 | |
| 2017/0114951 A1 * | 4/2017 | Lane | A01M 31/06 | |
| 2019/0037830 A1 * | 2/2019 | Cagle | A01M 31/004 | |

FOREIGN PATENT DOCUMENTS

| | | | | |
|---|---|---|---|---|
| FR | 1361893 A * | 5/1964 | | A01M 31/06 |
| FR | 1371064 A * | 8/1964 | | A01M 31/06 |
| GB | 193738 A * | 3/1923 | | A01M 31/06 |

* cited by examiner

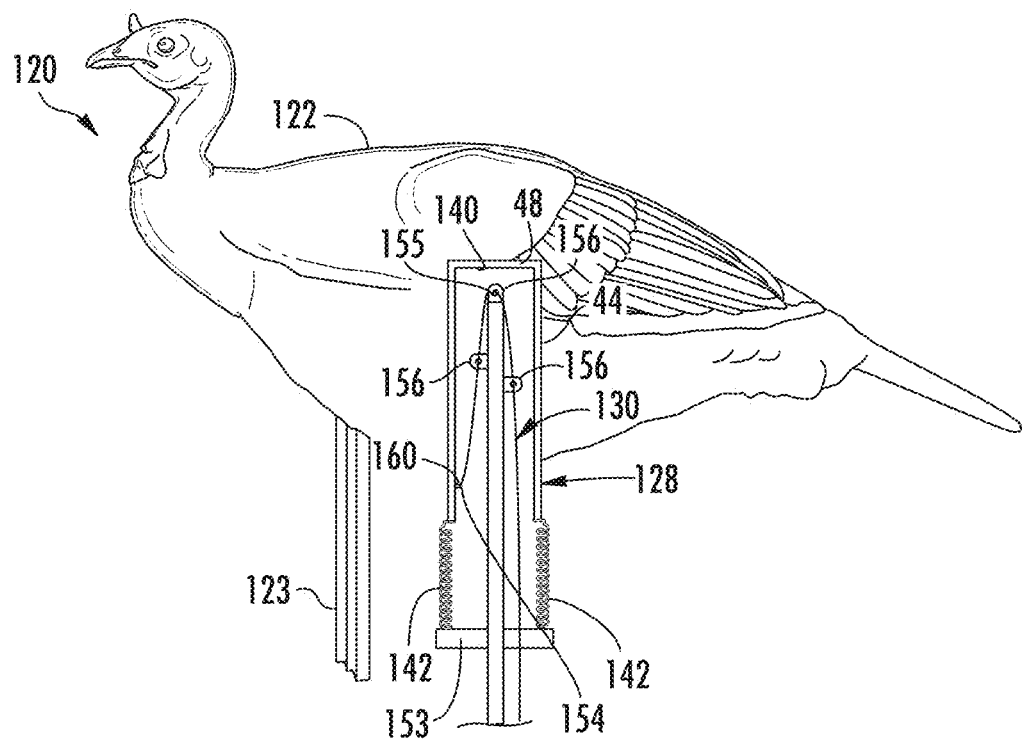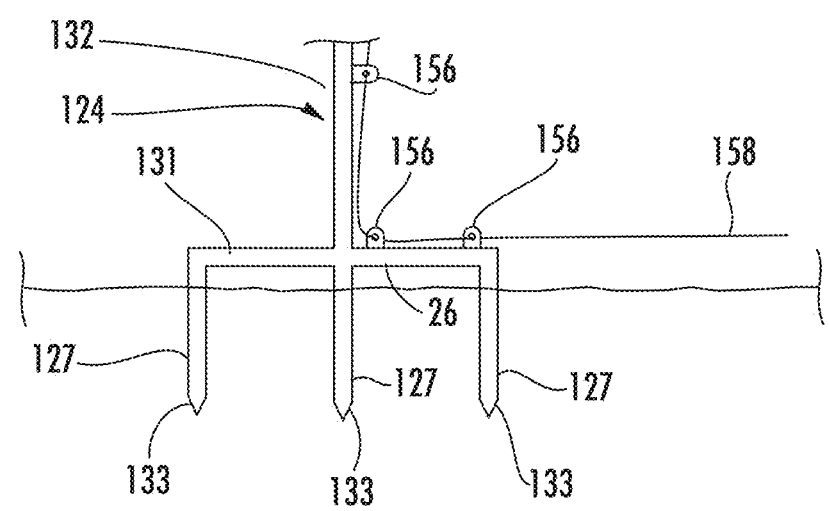
FIG. 2

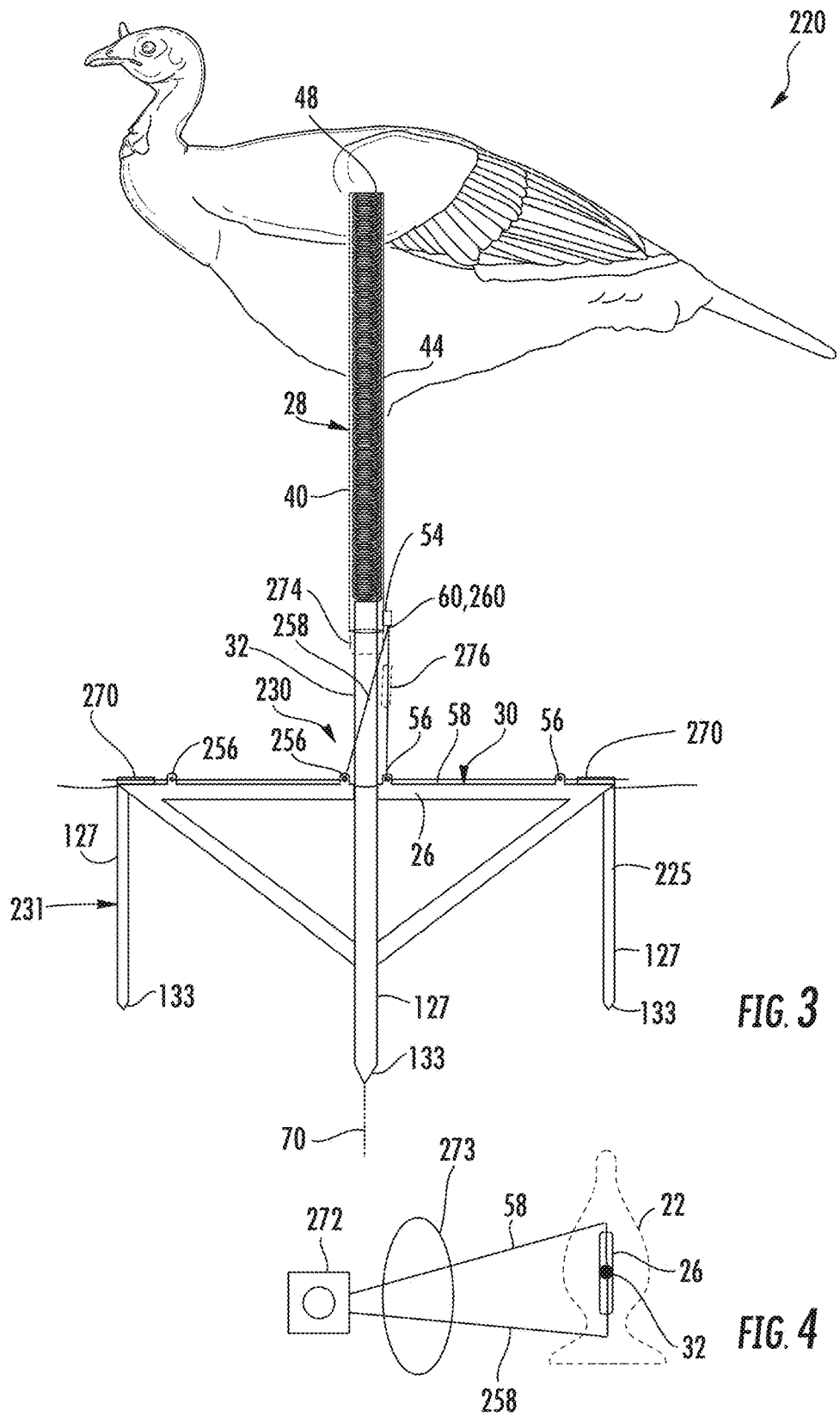

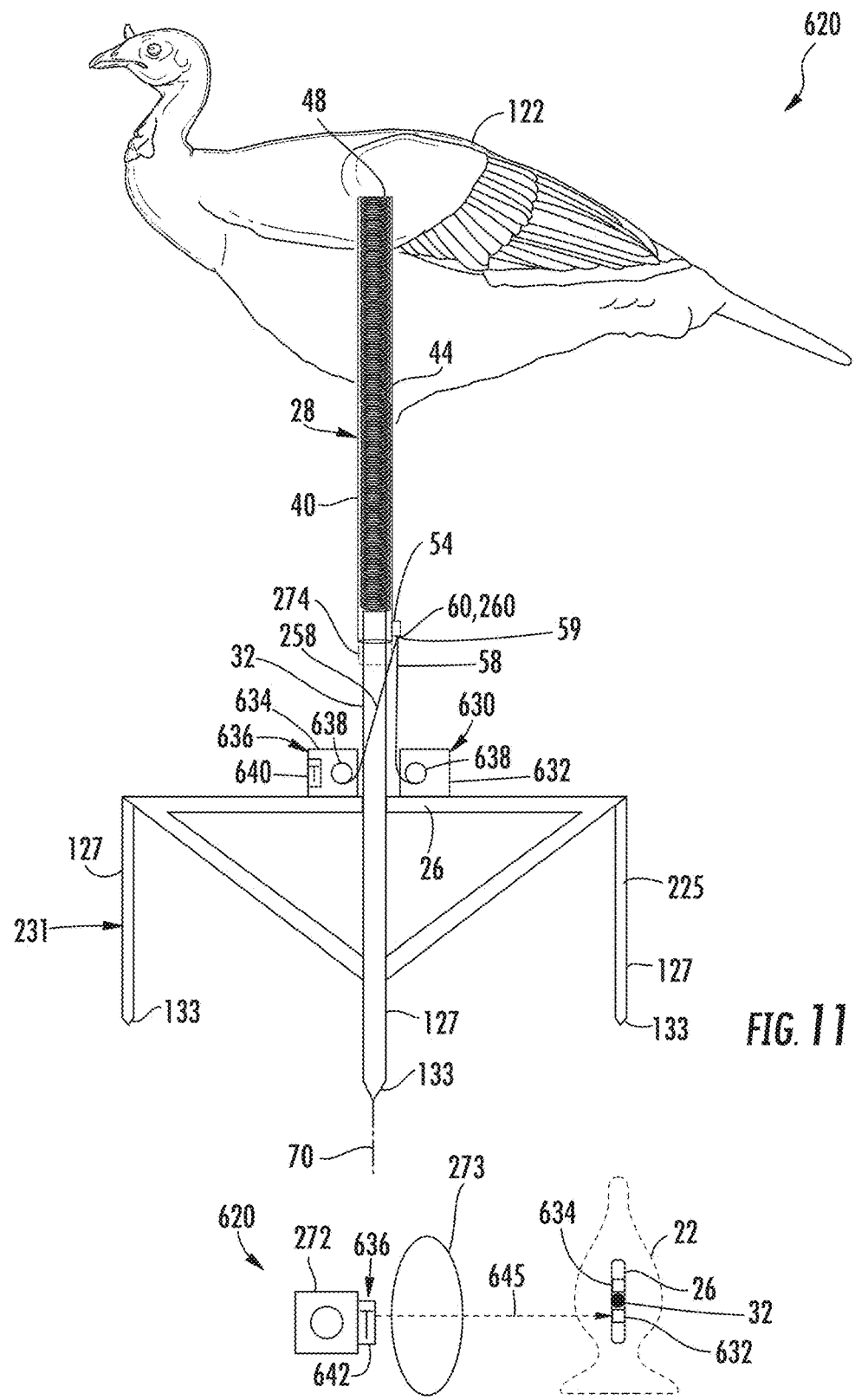

FOWL DECOY MOVEMENT SIMULATOR

CROSS-REFERENCE TO RELATED APPLICATIONS

The present application is a nonprovisional application claiming priority under 35 USC § 119 from U.S. Provisional Patent Application Ser. No. 62/297,939 filed on Nov. 21, 2016 by Samuel D. Cagle and entitled FOWL DECOY MOVEMENT SIMULATOR, the full disclosure which is hereby incorporated by reference.

BACKGROUND

Decoys for wildfowl, such as wild turkeys, ducks and other birds are frequently used to attract live wildfowl for wildlife observation and hunting. The ability of such decoys to effectively attract live wildfowl may depend upon the ability of the decoys to deceive the live wildfowl into believing that the decoy is another live wildfowl. Existing decoys do not effectively attract live wildfowl.

BRIEF DESCRIPTION OF THE DRAWINGS

FIG. 2 is fragmentary side view (with portion shown in section) of another example decoy system.

FIG. 3 is a partially exploded side view (with portion shown in section) of another example decoy system.

FIG. 4 is a top view of the decoy system of FIG. 3.

FIG. 11 is a partially exploded side view (with portion shown in section) of another example decoy system.

FIG. 12 is a top view of the decoy system of FIG. 11.

DETAILED DESCRIPTION OF EXAMPLES

Figure 1:
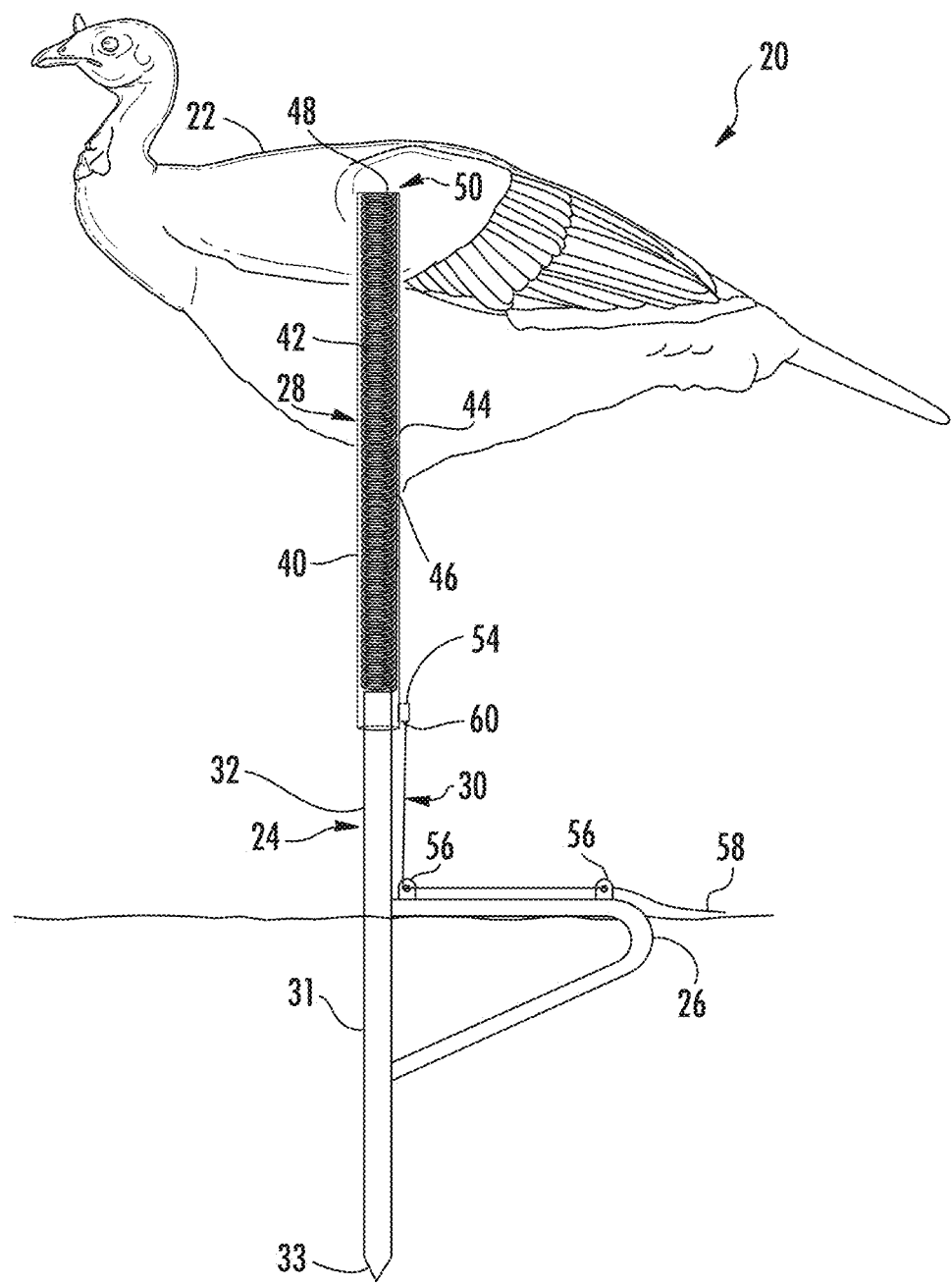
FIG. 1 partially exploded side view (with portions shown in section) of an example decoy system.

FIG. 1 is a diagram of an example decoy system 20 which more effectively attracts wildfowl. System 20 comprises decoy 22, ground support 24, bar 26, elevator assembly 28 and actuator 30. For purposes of illustration, decoy 20 is illustrated much smaller and out of proportion relative to the remaining illustrated components of system 20. Decoy 22 comprises a body simulating the body of a live fowl or bird. Decoy 22 may be formed from wood, molded polymers, or other materials. In one implementation, decoy 20 is formed from a molded polymer which is painted or colored to simulate a life file. In one implementation, decoy 22 models the body of a wild turkey. In the example illustrated, decoy 22 comprises a turkey hen. In other implementations, decoy 22 models the body or parts of a body of another wild fowl or bird.

In the example illustrated, decoy 22 omits legs for the wild fowl. In other implementations, decoy 22 additional comprises legs extending from an underside of the decoy 22, wherein the legs are foldable, collapsible or bendable to accommodate rising and lowering of decoy 22. In one implementation, decoy 22 has a weight of between two and 3 pounds. In other implementations, decoy 22 may have other sizes and weights.

Ground support 24 comprises a structure which supports decoy 22 relative to an underlying terrain, such as the ground. In the example illustrated, ground support 24 comprises ground engaging portion 31 and upstanding post 32. Ground engaging portion 31 comprises a structure to support post 32 in upstanding orientation relative to the ground or terrain. In the example illustrated, around engaging portion 31 comprises the end portion of a ground stake having a tapered tip 33 to facilitate penetration of the ground stake into the ground. In the example illustrated, ground engaging portion 31, comprising a ground state, has a length of between 4 and 8 inches, and nominally about 6 inches. Although the ground stake serving of ground engaging portion 31 is illustrated as comprising a single rod that is penetrated into the ground, in other implementations, the ground stake serving as ground engaging portion 31 comprises multiple spaced prongs or rods which are penetrated into the ground for support of decoy 22.

In yet other implementations, ground engaging portion 31 comprises a platform, base or feet which extend across and upon a top of the terrain or ground, without penetrating the underlying ground. In yet other implementations, ground invasion portion may comprise both a platform, base or feet which extend across a top of the ground and a ground penetrating member that is inserted are pressed into the ground.

Upstanding post 32 extends upwardly from ground engaging portion 31. Upstanding post 32 cooperates with elevator mechanism 28 to facilitate vertical reciprocation of decoy 22. In the example illustrated, upstanding post 32 has a length of between 12 inches and 14 inches. In other implementations, upstanding post 32 may have other lengths.

Bar 26 comprise a structure extending sideways from ground support 24. In the example illustrated, bar 26 comprise a foot press bar to facilitate use of a person's foot for pushing ground support 24, in the form of a ground stake, into the ground. In other implementations, in which ground support 24 does not comprise a ground stake or a group of ground stakes, bar 26 may comprise the platform, base or feet extends along the surface of the ground and which supports the upstanding post 32 of ground support 24.

Elevator assembly 28 comprise a mechanism to facilitate and guide upwards and downwards reciprocating vertical movement of decoy 22 relative to the underlying ground. In the example illustrated, elevator assembly 28 comprises outer tube 40 and bias 42. Outer tube 40 serves as a decoy support member to which decoy 22 is supported and mounted. Outer tube 40 comprises a sleeve that linearly and vertically slides up and down along upstanding post 32 which guides the sliding movement of outer tube 40.

Outer tube 40 is connected to decoy 22. In the example illustrated, outer tube 40 is insertable at least partially into the interior of body 22. In the example illustrated, outer tube 40 insertable into a vertical passage, channel or opening 44 extending within decoy 22 and having a mouth 46 on a bottom side of decoy 22. In the example illustrated, the end of outer tube 40 is contained within decoy 22, without completely passing through decoy 22. In the example illustrated, outer tube 40 has a length and an internal diameter sufficient to contain bias 42 as bias 42 changes shape or moves during vertical reciprocation of decoy 22 by a vertical distance of between 4 inches and 8 inches, nominally about 5.4 inches. In the example illustrated, outer tube 40 has a length of approximately 8.5 inches.

Bias 42 comprises a mechanism that resiliently biases decoy 22 to a raised state. In the example illustrated, bias 42 comprises a compression spring captured between an axial end of upstanding post 32 and an interior surface 48 of decoy 22 or blind end 48 of passage 44. In one implementation, the compression spring forming bias 42, in a relaxed uncompressed state, extends axially beyond outer tube 40 such applied an additional range of movement given the size of outer tube 40. In other implementations, the end 50 of outer tube 40 is capped or occluded such that the compression spring forming bias 42 is captured between post 32 and the occluded end 50.

In one implementation, tube 40 has an inside diameter of 0.49 inches. In such an implementation, the spring of bias 42 comprises the compression cylinder of music wire having a free length of 11.15 inches, an outside diameter of 0.48 inches, and inside diameter of 0.404 inches, the rate of 0.684 pounds per inch, the spring index C of 11.6316 with 50.75 active coils and 52.75 total coils having a pitch of 0.2175 inches, a pitch angle of 8.9022 inches and a Devel length of 73.248 inches. In other implementations, tube 40 and the spring of bias 42 may have other configurations.

Actuator 30 comprises a mechanism by which the wildlife observer or hunter may remotely actuate elevator mechanism 28 to vertically reciprocate decoy 22. In the example illustrated, actuator 30 comprises anchor 54, guides 56 and flexible line 58. Anchor 54 comprises a structure coupled to outer tube 40 connected to flexible line 58. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

Because anchor 54 is coupled to outer tube 40, decoy 22 may be slid off of and removed from outer tube 40, allowing different decoys 22 to be interchanged upon outer tube 40. In other implementations, outer tube 40 is integrally formed as a single unitary body with decoy 22. In yet another implementation, anchor 54 is alternatively directly connected to or coupled to decoy 22. Guides 56 comprise structures which guide the direction and extension of flexible line 58. In one implementation, guides 56 comprise grommets formed upon bar 26. In other implementations, guides 56 may comprise other structures and may be provided at other locations or upon other structures of system 20.

Flexible line 58 comprises a cable, string, filament, wire or other similar elongated thin flexible, bendable line. For example, in one implementation of a flexible line 58 may comprise transparent fishing line. Flexible line has a first end 60 secured to anchor 54 of outer tube 40. Flexible line 58 extends vertically from anchor 54 downwards turns and passes through guides 56. Guides 56 direct flexible line 58 along bar 26 and ultimately to a remote camouflaged location of a person using system 20.

In operation, the person at the camouflaged location pulls upon flexible line 58 which results in outer tube 40 and decoy 22 being pulled or drawn downwards along upstanding post 32 of ground support 24. During such time, the compression spring of bias 42 is compressed. Release or letting out of flexible line 58 by the person at the camouflaged location allows bias 42 to once again expand or return to a default state, lifting outer tube 40 and decoy 22. In the example illustrated, decoy may move upwards and downwards through a vertical distance or vertical range of at least 4 inches and a range of no greater than 8 inches.

Through repeated pulling and releasing of flexible line 58, a person is able to quickly and easily vertically reciprocate decoy 22. Such vertical reciprocation of decoy 22 simulates the natural dropping moving upwards and downwards of a female wild fowl when ready to mate. For example, a female turkey, when ready to mate, will exhibit submissive breeding behavior by dropping down facilitate mounting by a male wildfowl. Such behavior is common amongst wild turkeys. Because the hidden or camouflaged person is able to actuate decoy 22 to better simulate more realistic or natural mating behavior of the female bird, the decoy 22 is more likely to appear live and entice or attract a male gendered live bird.

In the example illustrated, elevator mechanism 28 of system 20 utilizes pulling of a flexible line 58 to lower a decoy 22 and outer tube 40 against the bias force of a compression spring 42 which is compressed during downward movement of decoy 22, wherein release of the flexible line allows the compression spring serving as bias to return towards the initial or default state of the compression spring, once again raising outer tube 40 and decoy 22. In other implementations, elevator mechanism 28 may have other configurations.

FIG. 2 illustrates decoy system 120, another example implementation of decoy system 20. Decoy system 120 comprises decoy 122, ground support 124, elevator assembly 128 and actuator 130. Decoy 122 is similar to decoy 22 except the decoy 122 additionally comprises legs 123. Those remaining structures or components of decoy 122 which correspond to structures or components of decoy 22 are numbered similarly. Legs 123 extend outwardly from an underside of the body of decoy 122. Each of legs 123 may be colored or painted to simulate legs of associated wild fowl. Each of legs 123 is bendable, foldable or flexible so as to bend our collapse when decoy 122 is in a lowered state, proximate to the ground. In other implementations, legs 123 are omitted. In one implementation, decoy 122 models the body of a wild turkey. In other implementations, decoy 122 models the body or parts of a body of another wild fowl or bird.

Ground support 124 comprises a structure which supports decoy 122 relative to an underlying terrain, such as the ground. In the example illustrated, ground support 124 comprises ground engaging portion 131 and upstanding post 132. Ground engaging portion 131 comprises a structure to support post 132 in upstanding orientation relative to the ground or terrain. In the example illustrated, ground engaging portion 131 comprises a fork like structure having a plurality of ground engaging stakes 127 having tapered tips 133 to facilitate penetration of the ground stakes into the ground. In the example illustrated, each of ground engaging stakes 127 has a length of between 4 and 8 inches, and nominally about 6 inches. Although the ground stakes serving of ground engaging portion 131 is illustrated as comprising a multiple stakes that are penetrated into the ground, in other implementations, the ground stakes serving as ground engaging portion 131 alternative comprise a single ground stake such as shown in FIG. 1.

In yet other implementations, ground engaging portion 131 comprises a platform, base or feet which extend across and upon a top of the terrain or ground, without penetrating the underlying ground. In yet other implementations, ground invasion portion may comprise both a platform, base or feet which extend across a top of the ground and a ground penetrating member that is inserted are pressed into the ground.

Upstanding post 132 extends upwardly from ground engaging portion 131. Upstanding post 132 cooperates with elevator mechanism 128 to facilitate vertical reciprocation of decoy 122. In the example illustrated, upstanding post 132 has a length of between 12 inches and 14 inches. In other implementations, upstanding post 132 may have other lengths.

Elevator assembly 128 comprise a mechanism to facilitate and guide upwards and downwards reciprocating vertical movement of decoy 122 relative to the underlying ground. In the example illustrated, elevator assembly 128 comprises outer tube 140 and bias 142. Outer tube 140 comprises a sleeve that linearly and vertically slides up and down along upstanding post 32 which guides the sliding movement of outer tube 140. Outer tube 140 receives an end portion of upstanding post 132.

Outer tube 140 is connected to decoy 122. In the example illustrated, outer tube 140 is insertable at least partially into the interior of body 122. In the example illustrated, outer tube 140 insertable into a vertical passage, channel or opening 44 extending within decoy 122 and having a mouth 46 on a bottom side of decoy 122. In the example illustrated, the end of outer tube 140 is contained within decoy 22, without completely passing through decoy 122. In the example illustrated, outer tube 140 is substantially contained or received within decoy 122. In the example illustrated, outer tube 40 has a length of approximately 8.5 inches.

Bias 142 comprises a mechanism that resiliently biases decoy 122 to a lowered state. In the example illustrated, bias 142 comprises a tension spring having a first end portion anchored to either decoy 122 and/or outer tube 140 and a second end portion anchored to a lower portion of ground support 124. In the example illustrated, upstanding post 132 comprises a shoulder collar 153 to which the second end portion of bias 142 is anchored. In other implementations, the second end of bias 142 alternatively anchored into the ground or to ground engaging portion 131. In other implementations, bias 142 may comprise a bungee cord, rubber band other similar members which are stretchable to an elongated state, but which resiliently returned to an unstretched or shorter state. In some implementations, bias 142 may be omitted, wherein gravity and the weight of decoy 122 returns decoy 1222 a lowered state after decoy 122 has been raised.

Actuator 130 comprises a mechanism by which the wildlife observer or hunter may remotely actuate elevator mechanism 128 to vertically reciprocate decoy 122. In the example illustrated, actuator 130 comprises anchor 154, guide 155 and guides 156 and flexible line 158. Anchor 154 comprises a structure coupled to outer tube 140 and connected to flexible line 158. Because anchor 154 is coupled to outer tube 140, biased 142 may be disconnected from collar 153 or from decoy 122, allowing decoy 122 may be slid off of and removed from outer tube 140, allowing different decoys 122 to be interchanged upon outer tube 140. In other implementations, outer tube 40 is integrally formed as a single unitary body with decoy 122. In yet another implementation, anchor 154 is alternatively directly connected to or coupled to decoy 122.

Guide 155 comprises a rounded structure at the tip of upstanding post 132 about which flexible line 158 turns from extending upwardly to extending downwardly. In one implementation, guide 155 comprises a rounded smooth surface along which then again switch flexible line 158 slides or glides. In another implementation, guide 155 comprises an idling rotatable disk, wheel or pulley.

Guides 156 comprise structures which guide the direction and extension of flexible line 158. In one implementation, guides 56 comprise grommets formed upon post 132 and ground engaging portion 131 of ground support 124. In the example illustrated, the grommets serving as guides 56 that extend from post 132 within outer tube 140 surface space the interior surface of outer tube 140 from opposing portions of post 132 to provide sufficient space for movement of flexible line 158 between post 132 and outer tube 140. In other implementations, guides 156 may comprise other structures and may be provided at other locations or upon other structures of system 120.

Flexible line 158 comprises a cable, string, filament, wire or other similar elongated thin flexible, bendable line. For example, in one implementation of a flexible line 158 may comprise transparent fishing line. Flexible line 158 has a first end 160 secured to anchor 154. Flexible line 158 extends vertically upwards from anchor 154, through guide 156 and about guide 155 until turning downwards and passing through guides 156 along post 132. Guides 156 direct flexible line 158 along post 132, through a 90° turn and along a top of ground engaging portion 131, ultimately extending to a remote camouflaged location of a person using system 120.

In operation, the person at the camouflaged location pulls upon flexible line 158 which results in outer tube 140 and decoy 122 being lifted upwards along upstanding post 132 of ground support 124. During such time, bias 142 is resiliently stretched. Release or letting out of flexible line 158 by the person at the camouflaged location allows bias 142 to once again unstretch to return to a default state, pulling outer tube 140 and decoy 122 downwards into closer proximity with the ground. Through repeated pulling and releasing of flexible line 158, a person is able to quickly and easily vertically reciprocate decoy 122. Such vertical reciprocation of decoy 122 simulates the natural dropping moving upwards and downwards of a female wild fowl when ready to mate. For example, a female turkey, when ready to mate, will exhibit submissive breeding behavior by dropping down facilitate mounting by a male wildfowl. Such behavior is common amongst wild turkeys. Because the hidden or camouflaged person is able to actuate decoy 122 to better simulate more realistic or natural mating behavior of the female bird, the decoy 122 is more likely to appear live and entice or attract a male gendered live bird.

Unlike decoy system 20 in which decoy 22 is maintained in a raised state absent pulling of flexible line 58, decoy system 120 maintains decoy 122 in a lowered state absent pulling a flexible line 58. In some circumstances, it may be beneficial to have decoy 22, 122 in the raised state for prolonged periods of time to ensure that the live fowl being attracted see the decoy prior to the decoy being moved to the lower state. Decoy system 20 provides such a state with less needed intervention by the camouflaged wildlife observer or hunter.

FIG. 3 illustrates decoy system 220, another example implementation of decoy system 20. Decoy system 220 is similar to decoy system 20 except that decoy system 220 comprises ground engaging portion 231 in lieu of ground engaging portion 31 is and additionally comprises actuator 230 and position locks or position retainers 270. Those remaining components of system 220 which correspond to components of system 20 are numbered similarly.

Ground engaging portion 231 is similar to ground engaging portion 131 described above. Ground engaging portion 231 comprises a fork like structure having a plurality of ground engaging stakes 127 having a tapered tips 133 to facilitate penetration of the ground stakes into the ground. In the example illustrated, each of stakes 127 has a length of between four and 8 inches, and nominally about 6 inches. Although the ground stakes serving as ground engaging portion 231 are illustrated as comprising a multiple stakes that are penetrated into the ground, in other implementations, the ground stakes serving as ground engaging portion 231 alternatively comprise a single ground stake such as shown in FIG. 1.

Actuator 230 is similar to actuator 30 except that actuator 230 comprises guides 256 angularly offset about the axis 70 of upstanding post 32 with respect to guides 56. Actuator 230 additionally comprises anchor 54 (described above), and flexible line 258. Flexible line 258 is similar to flexible line 58. Flexible line 258 comprises a cable, string, filament, wire or other similar elongated thin flexible, bendable line. For example, in one implementation, flexible line 258 may comprise transparent fishing line. Flexible line 258 has a first end 260 secured to anchor 54 of outer tube 40 (or directly to decoy 22). Flexible line 258 extends vertically from anchor 254 downwards until turning and passing through guides 256. Guides 256 direct flexible line 258 along bar 26 and ultimately to a remote camouflaged location of a person using system 20. In the example illustrated, after exiting the end most or last guide 256 on bar 26, both lines 58, 258 extend into the drawing sheet or out of the drawing sheet to the person manually actuating actuators 30, 230. FIG. 4 is an overhead view or top view illustrating lines 58, 258 extending from bar 26 to a person 272 behind the camouflaged or brush area 273. Because guides 56 and 256 are angularly offset respect to one another about axis 70, sequential pulling of flexible lines 58, 258 results in pivoting or rotation of decoy 22 about axis 70.

In operation, the person 272 at the camouflaged location pulls upon flexible line 58 which results in outer tube 40 and decoy 22 being pulled or drawn downwards along upstanding post 32 of ground support 24. During such time, the compression spring of bias 42 is compressed. Release or letting out of flexible line 58 by the person at the camouflaged location allows bias 42 to once again expand or return to a default state, lifting outer tube 40 and decoy 22. In the example illustrated, decoy 22 moves upwards and downwards through a vertical distance or vertical range of at least 4 inches, a range of no greater than 8 inches and a range of nominally 5.4 inches.

Through repeated pulling and releasing of flexible line 58, a person is able to quickly and easily vertically reciprocate decoy 22. Such vertical reciprocation of decoy 22 simulates the natural dropping moving upwards and downwards of a female wild fowl when ready to mate. For example, a female turkey, when ready to mate, will exhibit submissive breeding behavior by dropping down facilitate mounting by a male wildfowl. Such behavior is common amongst wild turkeys. Because the hidden or camouflaged person is able to actuate decoy 22 to better simulate more realistic or natural mating behavior of the female bird, the decoy 22 is more likely to appear live and entice or attract a male gendered live bird.

Should the person 272 desire to rotate decoy 22 about axis 70, the person may pull flexible line 258 which results in tube 40 and decoy 22 rotating about axis 70. In circumstances where decoy 22 is already in a fully lowered state, pulling on such line 258 merely results in rotation of decoy 22. Alternatively, if circumstances where decoy 22 is not yet in the fully lowered state (the bottom of tube 40 contacting the ground, the bottom of tube 40 contacting bar 26 or bias 42 being no longer compressible), pulling of flexible line 258 by the person or user 272 additionally and concurrently lowers tube 40 and decoy 22.

After flexible line 258 has been pulled to rotate decoy 22, decoy 22 remains in the new angular state about axis 70 until flexible line 58 is subsequently pulled. For example, FIG. 3 illustrates decoy 22 facing to the left. In the state shown, the person may pull flexible line 58 to raise and lower decoy 22 while decoy 22 remains in the leftward looking angular orientation. As a result of flexible line 258 being pulled, decoy 22 rotates to a position in which decoy 22 now faces to the right. In such a state, the person may pull flexible line 258 to raise and lower decoy 22 while decoy 22 remains in the rightward looking orientation. To once again change the angular orientation of decoy 22, the user pulls on flexible line 58 to return decoy 22 to the leftward looking orientation. As a result, system 220 allows a user to change decoy 22 to a selected angular orientation and then subsequently repeatedly raise and lower decoy 22 while decoy 22 remains in the selected angular orientation.

In another implementation, as schematically shown by broken lines, system 220 additionally comprises a torsional bias 274. Torsional bias 274 resiliently biases 240 and decoy 22 to a selected angular orientation about axis 70. For example, in one implementation, torsional bias 274 comprises a torsion spring having one end secured to tube 40 and another end secured to post 32. During pulling of flexible line 258, tube 40 is rotated against the bias of torsional bias 274 to angularly reposition tube 40 and decoy 22. Upon release of flexible line 258, torsional bias 274 returns tube 40 and decoy 22 to the default angular orientation of decoy 22. In one such implementation, actuator 30 is omitted, wherein pulling of flexible line 258 concurrently lowers and rotates decoy 22 while release of flexible line 258 concurrently raises and oppositely rotates decoy 22. In implementations where actuator 230 is configured similar to actuator 130 described above with respect to FIG. 2, pulling a flexible line 258 concurrently raises and rotates decoy 22 while release of flexible line 258 concurrently lowers and oppositely rotates decoy 22.

As further schematically shown by FIG. 3, in yet another implementation, in lieu of torsional bias 274 comprising a torsion spring, system 220 may comprise a torsional bias 276 comprising a tension spring operably coupled between anchor 54 and bar 26. Pulling of flexible line 258 stretches the tension spring of torsional bias 276 as tube 40 and decoy 22 are rotated about axis 70 and lowered. Release of flexible line 258 allows the tension spring of bias 276 to retract towards its default relaxed state, rotating tube 40 and decoy 22 back to the default angular orientation with respect to axis 70. At the same time, release of flexible line 258 allows bias 42 to raise decoy 22 to the default raised state.

In each of the above-described systems 20, and 220, bias 42, in the form of a compression spring, is illustrated as being contained within tube 40, captured between post 32 and either a capped end of tube 40 or the stop surface provided by decoy 22. In other implementations, bias 42 comprises a compression spring captured between a bottom or shoulder of tube 40 (or decoy 22) and either the ground, a top surface of bar 26 or a shoulder or flange radially projecting from post 32.

Figure 5:
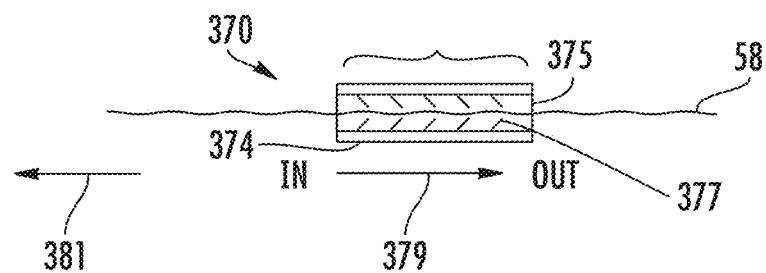
FIG. 5 is a top view of an example flexible line position retainer for use in the system of FIG. 3.
Figure 6:
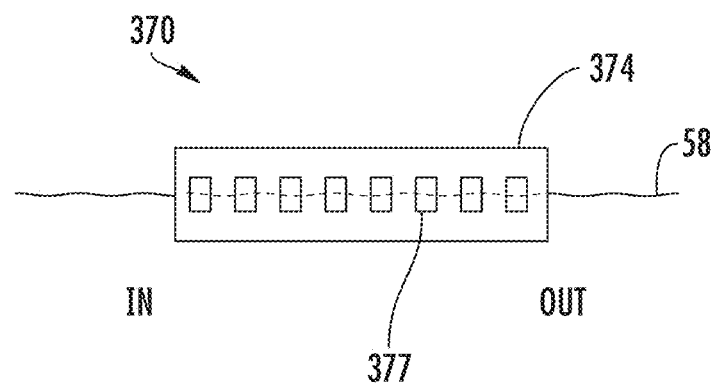
FIG. 6 is a side view of the flexible line position retainer of FIG. 5 with portions transparently shown.

Position retainers 270 comprise mechanisms that releasably lock or retain flexible lines 58, 258 in a selected position such that decoy 22 is also retained in a current state are selected position. FIGS. 5 and 6 illustrate retainer 370, a particular example implementation of one of retainers 270. As shown by FIG. 5, retainer 370 comprises a channel or a tube 374 having an interior 375 through which the flexible line 58, 258 extends. Retainer 370 additionally comprises a plurality of angled resiliently flexible line engaging teeth 377. During pulling of flexible line 58 (or 258) in the direction indicated by arrow 379, teeth 377 resiliently flex and bend to the right under the force of the line 58 being pulled. Upon release of line 58 or the cessation of pulling, teeth 377 resiliently return, pivoting in a direction opposite to arrow 379 while gripping flexible line 58. Such pivoting continues until teeth 377 may no low longer pivot, wherein the teeth 377 are each still angled to the right (as seen in FIG. 5) inhibiting further movement of flexible line 58 in the direction indicated by arrow 381. In essence, retainer 270 comprises a unidirectional ratchet or grip. To release line 58 from the grip and retention of teeth 377, tube 374 is configured or sized so as to allow a person to quickly snap up or pull on flexible line 58, lifting flexible line 58 from the teeth gripped position (shown in broken lines the FIG. 6) to the released raised state shown in FIG. 6, wherein flexible line 58 extends above teeth 377, allowing flexible line 58 to pass through tube 374 above teeth 377. In other implementations, tube 374 is alternatively configured to allow flexible line 58 to be snapped downward, wherein the line 58 is moved to below teeth 377, allowing flexible line 58 to pass through tube 374 below teeth 377 out of engagement with teeth 377.

Figure 7:
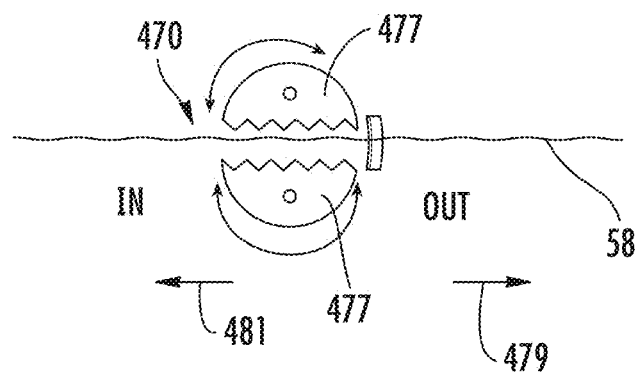
FIG. 7 is a top view of an example flexible line position retainer for use in the system of FIG. 3.
Figure 8:
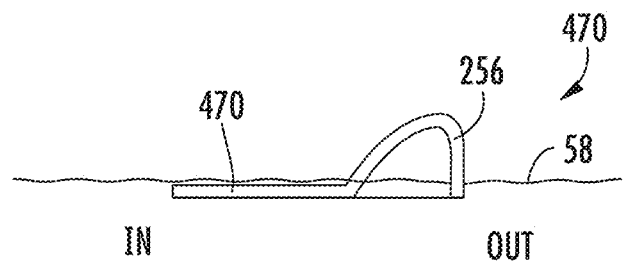
FIG. 8 is a side view of the flexible line position retainer of FIG. 5 with portions transparently shown.

FIGS. 7 and 8 illustrate retainer 470, another example implementation of retainer 270. Retainer 470 operates in a fashion similar to retainer 370 described above. Retainer 470 comprises a pair of opposite rotating teeth 477, between which line 58 extends. Teeth 477 rotate relative to one another between a first state in which line 58 is allowed to pass through or between teeth 477 in the direction indicated by arrow 479 and wherein teeth 477 pinch and grip flexible line 58 when flexible line 58 is moving in an opposite direction as indicated by arrow 481. For example, in one implementation, teeth 477 are permitted to freely rotate into pinching engagement line 58 when line 58 is being moved in a first direction, but are limited in their rotation relative to one another when line 58 is moving in the opposite direction. To release flexible line 58, a person simply snaps flex line 58 upwards or downwards out from between teeth 477.

Figure 9:
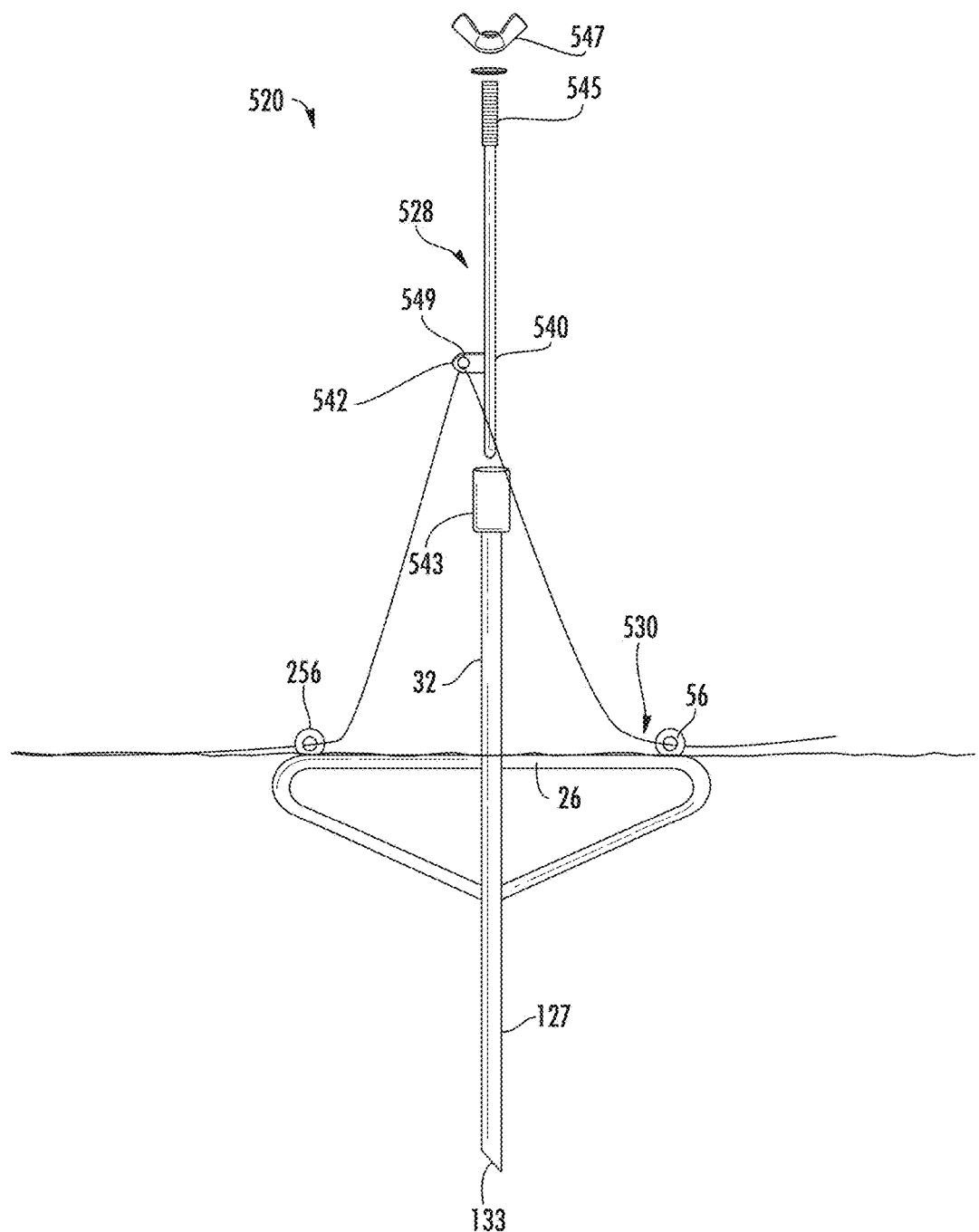
FIG. 9 is an exploded side view of another example decoy system.
Figure 10A:
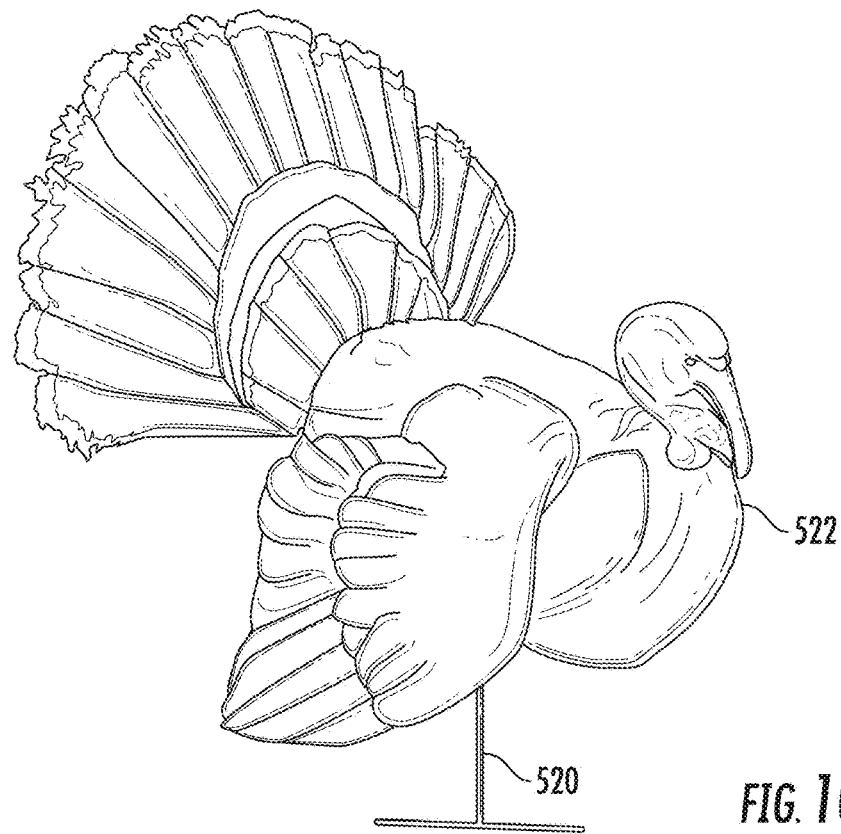
FIGS. 10A-10F are perspective views illustrating use of the decoy system of FIG. 9 to rotate an example decoy.
Figure 10B:
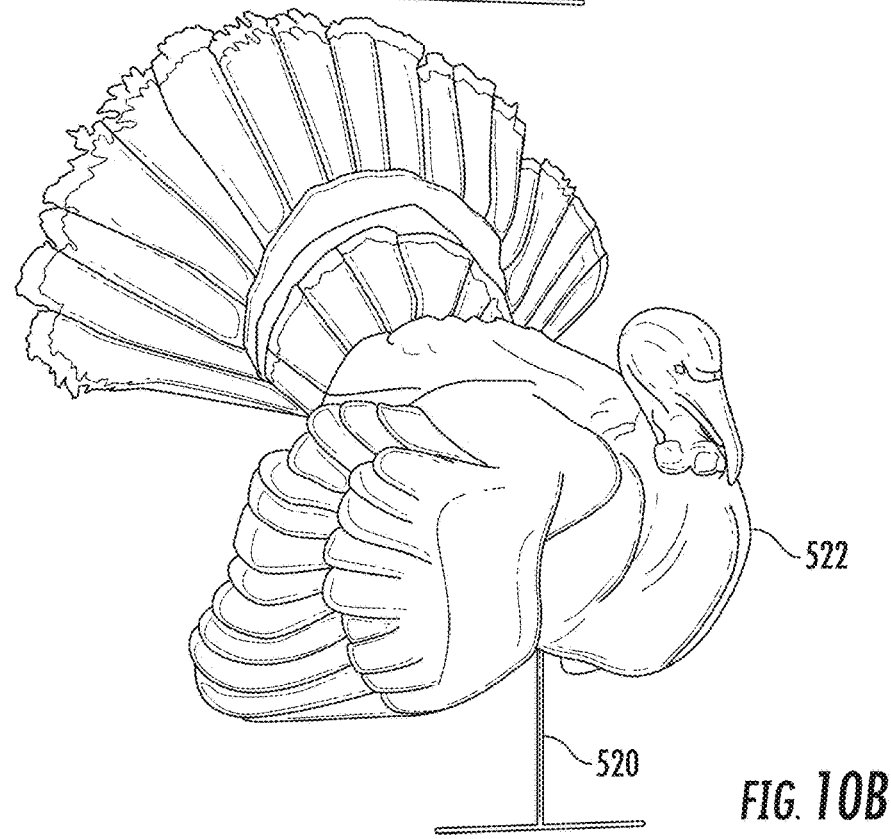
Figure 10C:
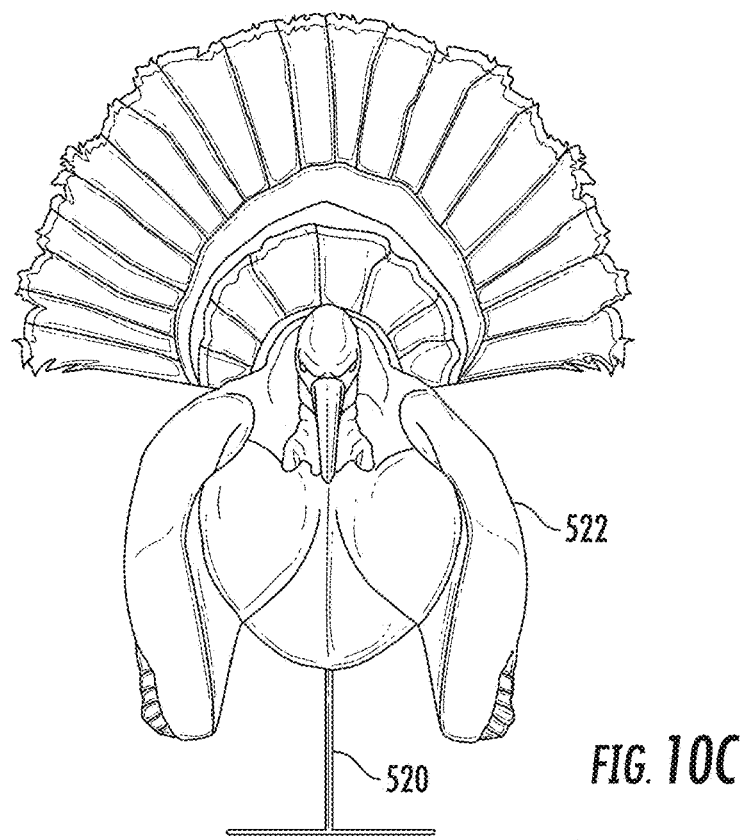
Figure 10D:
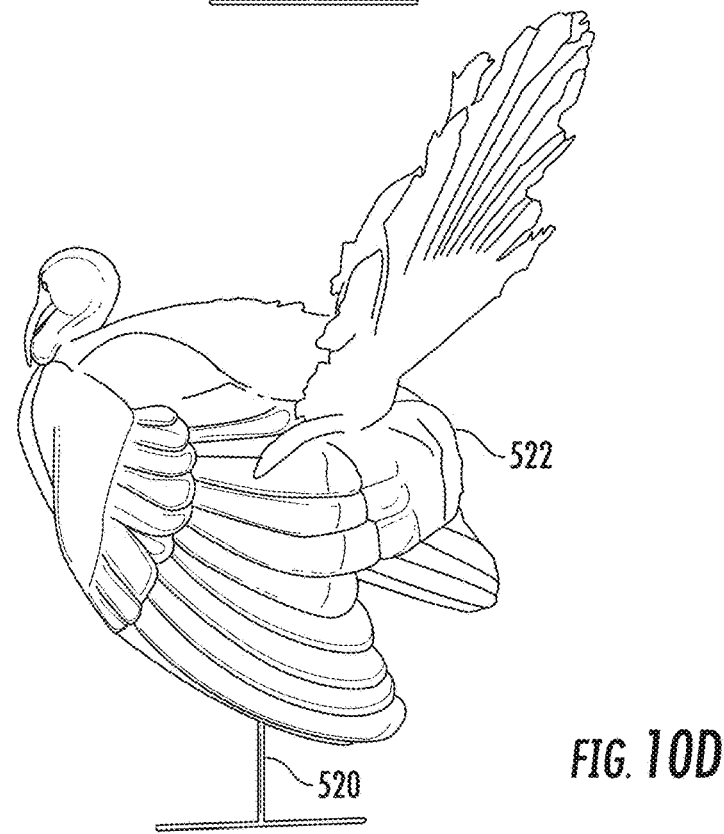
Figure 10E:
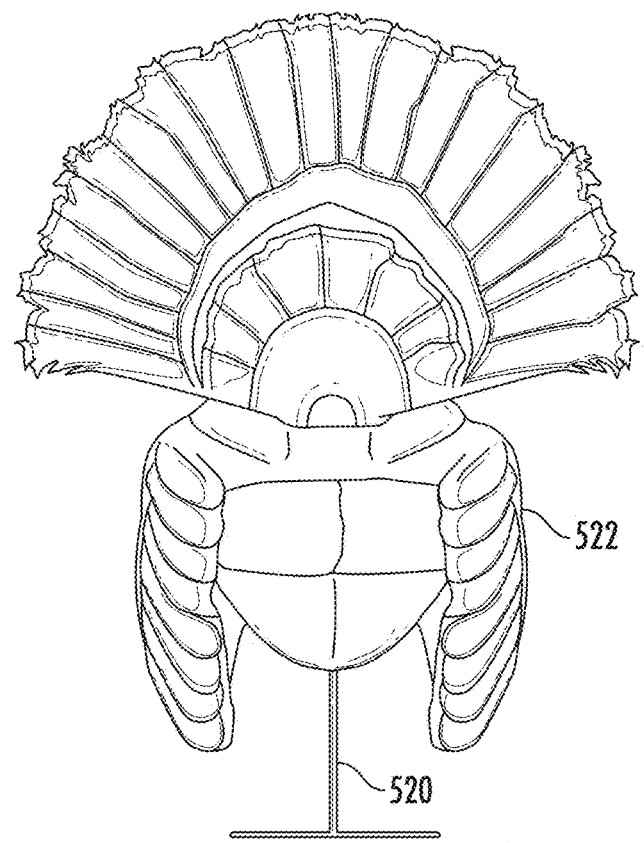
Figure 10F:
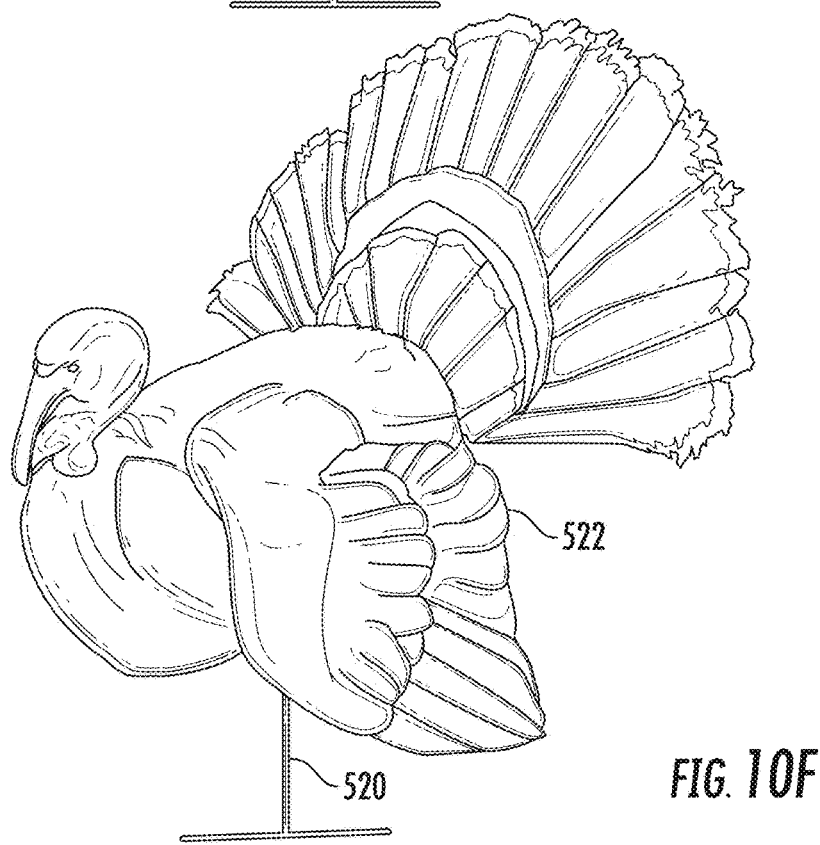

FIG. 9 illustrates decoy system 520, another example implementation of decoy system 20. Decoy system 520 is similar to decoy system 220 except that decoy system 520 comprises rotational assembly 528 and actuator 530 in place of elevator assembly 28 and actuator 30. Those remaining elements or components of system 520 which correspond to elements or components of system 220 are numbered similarly.

Rotational assembly 528 facilitates rotation of a supported decoy 22. Rotational assembly 528 comprises decoy support 540 and lever 542. Decoy support 540 comprises a tube, rod or other structure having a lower end rotatably supported by post 32 and an upper end adapted to be fixed to decoy 22. In the example illustrated, post 32 supports a hollow cylinder sleeve 543 in which support 540 is received and rotates about a vertical axis centered along post 32 and support 540.

In another implementation, support 540 may be fixed to a downwardly facing hollow sleeve or cylinder that receives the end of post 32. In yet other implementations, support 540 is rotationally supported for rotation relative to post 32 by other bearings or rotational support mechanisms.

In the example illustrated, the upper end of support 540 comprises external threads 545 for being secured to a fastener 547 to secure support 540 to decoy 22 such that decoy 22 rotates in unison with the rotation of support 540. In other implementations, the upper end of support 540 may be fixedly secured to decoy 22 in other fashion such as with welding, gluing, bonding, snap fits or other mechanisms.

Lever 542 comprises a projection, wing, arm or other extension extending from support 540, providing a lever arm by which torque may be applied to support 540 by actuator 530 to rotate support 540 and decoy 22. In the example illustrated, lever 542 has an eyelet 549 receiving the end of the flexible lines of actuator 530.

Actuator 530 is similar to actuator 230 except that actuator 530 omits guides 56, 256 closest to post 32. As a result, flexible lines 58, 258 apply a greater lever arm or force to lever 542 to rotate support 540 and decoy 22 in response to being pulled through the more outer guide 56, 256. In the example illustrated, actuator 530 omits the above-described anchor 54. In other implementations, actuator 530 may comprise anchor 54 to further assist in securing decoy 22 in a selected angular position.

In operation, the person 272 (shown in FIG. 4) at the camouflaged location pulls upon flexible line 58 which results in support 540 and decoy 22 being rotated in a first rotational direction (less than 360°). During such time, the flexible line 258 partially wraps about or crosses over the vertical axis of post 32 and support 540. Pulling of flexible line 258, while flex line 58 is released, results in support 540 and decoy 22 being rotated in a second opposite rotational direction (less than 360°).

Through alternating pulling and releasing of flexible lines 58, 258, a person is able to quickly and easily rotate support 540 and decoy 22. As a result, in circumstances where the decoy 22 is a male decoy, the decoy 22 will appear in a breeding type of display. For example, if circumstances where decoy 22 comprises a simulation of the male turkey, such rotation of decoy 22 will simulate a male turkey displaying his plumage in the state is known as strutting, wherein the male parades his feathers and tail which is fanned out to attract hens for breeding. Such rotation of the decoy 22 causes the decoy 22 to appear more alive, which will cause live male turkeys that can see the decoy moving in a manner that is trying to attract and turkeys to become territorial and aggressive. Consequently, surrounding live male turkeys will approach the rotating decoy 22 and come within range of wildlife observation, photography or harvesting (shooting). FIGS. 10A-10F illustrate the rotation of a male turkey decoy (Tom) 522 through approximately 180° through the use of actuator 530 of system 520.

Decoy system 520 is a mechanism of relative low complexity and cost that facilitates such selective and controlled manual rotation of decoy 22. The rotation of decoy 22 is facilitated by rotatably supporting decoy support 540 and facilitating manual rotation of support 543 lever and a pair of angularly spaced (preferably opposite) flexible line guides that are spaced from post 32. In some implementations, system 520 as well as the other above-described systems may omit decoy 22, wherein such systems are adaptable for use with previously purchased or prior owned existing decoys 22.

In yet another implementation, decoy support 540 is resiliently biased to a first angular position, wherein pulling of flexible line 56 rotates the decoy support 540 and the secured decoy 22 against the rotation of bias. For example, in one implementation, decoy support 540 is connected to post 32 by torsional spring or coil spring having one end secured to support 540 and a second end secured to post 32, wherein the torsional spring resists rotation of support 540. In such an implementation, guide 256 and flexible line 258 of actuator 530 may be omitted. Such an implementation, support 540 and decoy 22 resiliently return to a default first angular orientation upon the release of flexible line 56 after being rotated to a second angular position against the resulting bias through the pulling a flexible line 56. Although support 540 is illustrated as being elevated above the ground and elevated above guides 56, 256, in other implementations, support 540 may extend into closer proximity with respect to the ground and/or with respect to guides 56, 256.

FIGS. 11 and 12 illustrate decoy system 620, another example implementation of decoy system 220. Decoy system 620 is similar to decoy system 220 except that decoy system 620 comprises actuator 630 instead of actuator 230. Those remaining components of system 220 which correspond to components of system 20 are numbered similarly.

Actuator 630 is similar to actuator 230 except that actuator 630 replaces that portion of flexible lines 258 extending from ground support 231 to a remote user with a wireless transmitter and an electrically powered actuator. In the example illustrated, actuator 630 comprises powered actuators 632, 634 and wireless communication system 636. Powered actuator 632, 634 comprise powered mechanisms connected to line 58, 258 to selectively pull or release lines 58, 258 in response to signals from wireless communication system 636. In one implementation, powered actuator 632 and 634 each comprise a two directional motor and a spool 638 about which either line 58 or 258 winds or unwinds in response to actuation of the motor.

Wireless communication system 636 comprises transceiver 640 and a remote transceiver or transmitter 642 (shown in FIG. 12). Remote transceiver 642 receives input from the person behind camouflaged or brush area 273 and communicates signals wirelessly to transceiver 640. Transceiver 640 picks up such signals and outputs control signals in response thereto. Such control signals may result in actuators 632, 634 rotatably driving spools 638 at different rates to wind up the associated lines 58, 258 to either lower decoy 22 with rotation of decoy 22 or without rotation of decoy 22. In such control signals may result in actuator 632, 634 rotatably driving spools 638 at different rates to allow bias 44 to raise decoy 122.

FIG. 12 is an overhead view or top view of decoy system 620 with a wireless communication system 636 having a transmitter 642 under control of a person 272 behind the camouflaged or brush area 273. In operation, the person 272 at the camouflaged location provides input to a remote transmitter 642 to send signals 645 to transceiver 640, causing powered actuator 632 to pull upon flexible line 58 which results in outer tube 40 and decoy 22 being pulled or drawn downwards along upstanding post 32 of ground support 24. During such time, the compression spring of bias 42 is compressed. Alternative input to the remote transceiver 642 results in signals being transmitted to transceiver 640 causing actuator 632 to release or let out of flexible line 58 by the person at the camouflaged location, allowing bias 42 to once again expand or return to a default state, lifting outer tube 40 and decoy 22. In the example illustrated, decoy 22 moves upwards and downwards through a vertical distance or vertical range of at least 4 inches, a range of no greater than 8 inches and a range of nominally 5.4 inches.

Through repeated pulling and releasing of flexible line 58 through the use of actuator 632, a person is able to quickly and easily vertically reciprocate decoy 22. Such vertical reciprocation of decoy 22 simulates the natural dropping moving upwards and downwards of a female wild fowl when ready to mate. For example, a female turkey, when ready to mate, will exhibit submissive breeding behavior by dropping down facilitate mounting by a male wildfowl. Such behavior is common amongst wild turkeys. Because the hidden or camouflaged person is able to actuate decoy 22 to better simulate more realistic or natural mating behavior of the female bird, the decoy 22 is more likely to appear live and entice or attract a male gendered live bird.

Should the person 272 desire to rotate decoy 22 about axis 70, the person may provide input to transmitter 642 which outputs signals which are received by transceiver 640 which causes control signals to be output to actuator 634, causing actuator 634 to pull flexible line 258 which results in tube 40 and decoy 22 rotating about axis 70. In circumstances where decoy 22 is already in a fully lowered state, pulling on such line 258 merely results in rotation of decoy 22. Alternatively, if circumstances where decoy 22 is not yet in the fully lowered state (the bottom of tube 40 contacting the ground, the bottom of tube 40 contacting bar 26 or bias 42 being no longer compressible), pulling of flexible line 258 by the person or user 272 additionally and concurrently lowers tube 40 and decoy 22.

After flexible line 258 has been pulled to rotate decoy 22, decoy 22 remains in the new angular state about axis 70 until flexible line 58 is subsequently pulled. For example, FIG. 11 illustrates decoy 22 facing to the left. In the state shown, the person may pull flexible line 58 to raise and lower decoy 22 while decoy 22 remains in the leftward looking angular orientation. As a result of flexible line 258 being pulled, decoy 22 rotates to a position in which decoy 22 now faces to the right. In such a state, the person may provide input to remote transmitter 642, transmitting signals to transceiver 640 which cause control signals to be transmitted to actuator 634 so as to pull flexible line 258 to raise and lower decoy 22 while decoy 22 remains in the rightward looking orientation. To once again change the angular orientation of decoy 22, the user provides commands to remote transmitter 642 which are transmitted to transceiver 640, wherein control signals are output, causing actuator 632 to pull on flexible line 58 to return decoy 22 to the leftward looking orientation. As a result, system 220 allows a user to change decoy 22 to a selected angular orientation and then subsequently repeatedly raise and lower decoy 22 while decoy 22 remains in the selected angular orientation.

In another implementation, as schematically shown by broken lines, system 620 additionally comprises a torsional bias 274. Torsional bias 274 resiliently biases 240 and decoy 22 to a selected angular orientation about axis 70. For example, in one implementation, torsional bias 274 comprises a torsion spring having one end secured to tube 40 and another end secured to post 32. During pulling of flexible line 258 by actuator 634, tube 40 is rotated against the bias of torsional bias 274 to angularly reposition tube 40 and decoy 22. Upon release of flexible line 258 by actuator 634, torsional bias 274 returns tube 40 and decoy 22 to the default angular orientation of decoy 22. In one such implementation, actuator 630 is omitted, wherein pulling of flexible line 258 concurrently lowers decoy 22 while release of flexible line 258 concurrently raises and oppositely rotates decoy 22. In implementations where actuator 230 is configured similar to actuator 130 described above with respect to FIG. 2, pulling a flexible line 258 concurrently raises and rotates decoy 22 while release of flexible line 258 concurrently lowers and oppositely rotates decoy 22.

In each of the above-described systems 620, bias 42, in the form of a compression spring, is illustrated as being contained within tube 40, captured between post 32 and either a capped end of tube 40 or the stop surface provided by decoy 22. In other implementations, bias 42 comprises a compression spring captured between a bottom or shoulder of tube 40 (or decoy 22) and either the ground, a top surface of bar 26 or a shoulder or flange radially projecting from post 32.

Figure 13:
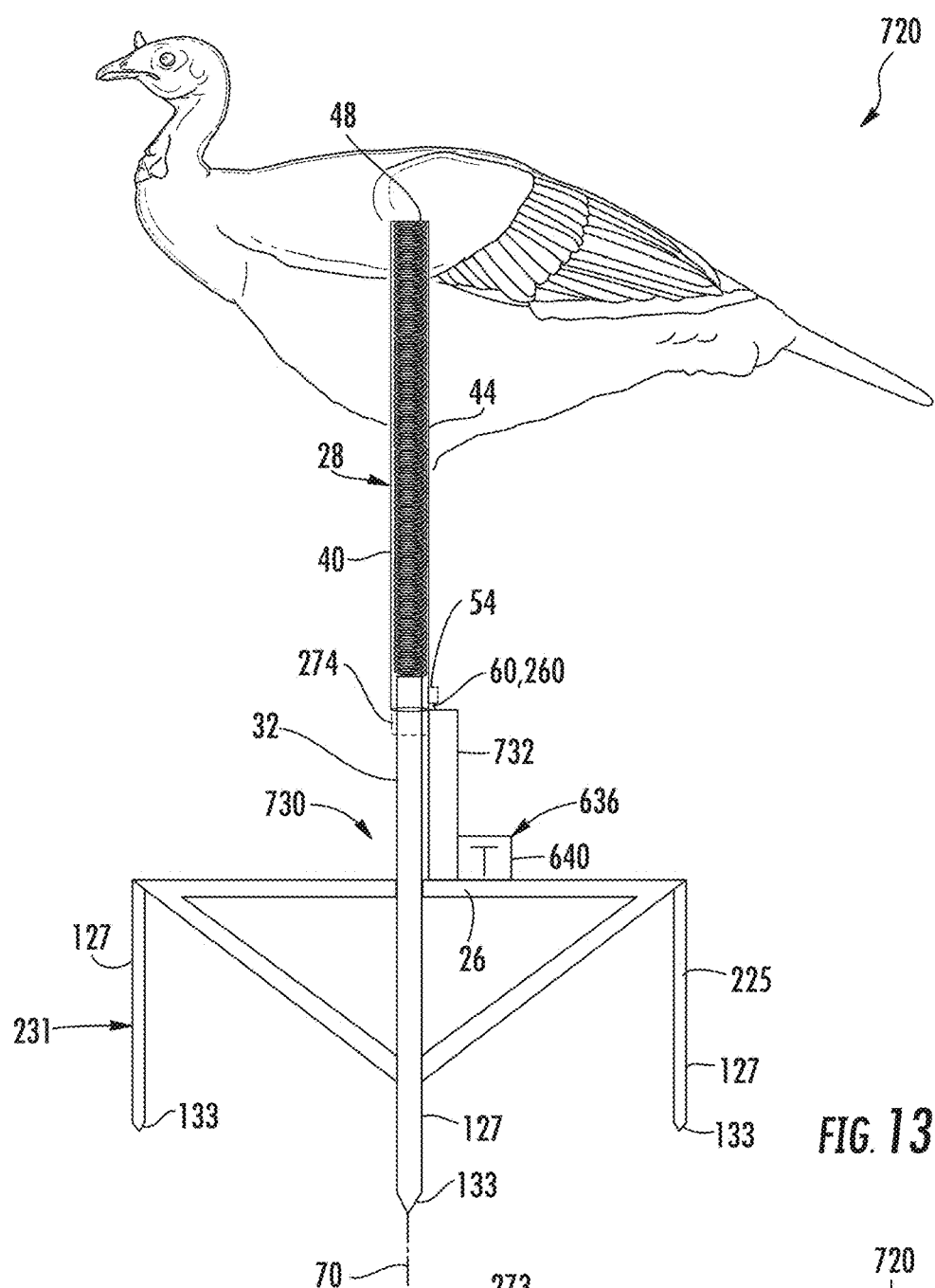
FIG. 13 is fragmentary side view (with portion shown in section) of another example decoy system.
Figure 14:
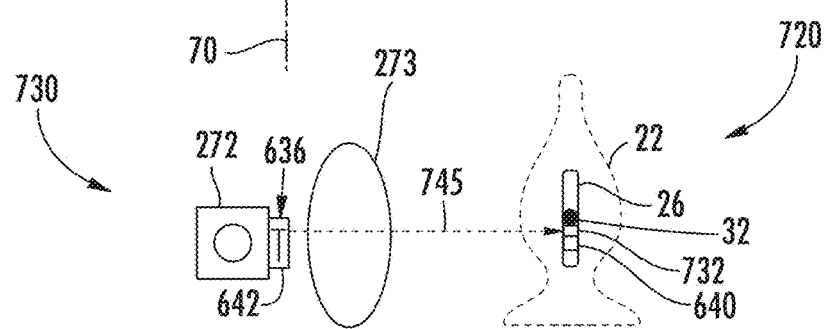
FIG. 14 is a top view of the decoy system of FIG. 13.

FIGS. 13 and 14 illustrate decoy system 720, another example implementation of system 220. System 720 is similar to system 220, except that decoy system 720 comprises actuator 730 instead of actuator 230. Those remaining components of system 720 which correspond to components of system 220 are numbered similarly.

Actuator 730 is similar to actuator 230 except that actuator 730 replaces that portion of flexible lines 258 extending from ground support 231 to a remote user with a wireless transmitter and an electrically powered actuator. In the example illustrated, actuator 730 comprises a powered actuator 732 and wireless communication system 636. In the example illustrated, powered actuator 732 comprises an electric solenoid (schematically shown) having a first portion fixed, such as being supported by ground support 231 and a second movable or extendable portion connected to anchor 60 and/or outer tube 40. In operation, remote transceiver 642 receives input from the person behind camouflaged or brush area 273 and communicates signals wirelessly to transceiver 640. Transceiver 640 picks up such signals and outputs control signals in response thereto. In response to such control signals, the electric solenoid of powered actuator 732 selectively raises and lowers tube 40 to raise and lower decoy 122.

Each of systems 620 and 720 are described as utilizing a wireless communication system 636. In other implementations, a wired communication system may alternatively be used, wherein a communications line or wire 745 (shown in broken lines) extends from transceiver 640 to remote transmitter 642. In such alternative implementations, the operation of systems 620 and 720 is as described above but for signals being transmitted through an across the wire or line extending along the ground.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A decoy support for supporting a wild fowl decoy, the decoy support comprising:

a ground support comprising a ground engaging portion and an upstanding linear post extending along an axis thereof from the ground engaging portion;

a decoy support member movably guided by the upstanding linear post between a raised position and a lowered position;

a compression spring coaxial with the upstanding linear post, the compression spring resiliently biasing the decoy support member towards the raised position;

a powered actuator coupled to the decoy support member to selectively compress the compression spring to lower the decoy support member vertically along the axis of the upstanding linear post while simultaneously rotating the decoy support member around the axis of the upstanding linear post; and a communications system having a receiver coupled to the powered actuator and a remote transmitter in communication with the receiver in a wired or wireless fashion, wherein signals transmitted from the remote transmitter to the receiver cause the powered actuator to selectively compress the compression spring.

2. The decoy support of claim 1, wherein compression of the compression spring by the powered actuator vertically lowers and simultaneously rotates the decoy support member in a first rotational direction around the axis of the upstanding linear post, the decoy support further comprising:

a second powered actuator coupled to the decoy support member to selectively compress the compression spring to lower the decoy support member vertically along the axis of the upstanding post while simultaneously rotating the decoy support member in a second rotational direction, opposite the first rotational direction, around the axis of the upstanding post.

3. The decoy support of claim 2, wherein the powered actuator and the second powered actuator are coupled to the decoy support member by being independently connected to the decoy support member by first and second flexible lines, respectively.

4. The decoy support of claim 1, wherein the powered actuator is coupled to the decoy support member so as to compress the compression spring to vertically lower the decoy support member along the axis of the upstanding post while maintaining an angular orientation of the decoy support member about the axis without rotating the decoy support member around the axis of the upstanding post after the decoy support member has reached the angular orientation about the axis of the upstanding post due to rotation of the decoy support member via the powered actuator.

5. The decoy support of claim 1, wherein the powered actuator is coupled to the decoy support member so as to rotate the decoy support member around the axis of the upstanding post while maintaining a height of the decoy support member without further compressing the compression spring and without further vertical lowering of the decoy support member when the decoy support member is at a lowest height defining the lowered position.

6. The decoy support of claim 1, wherein the powered actuator is coupled to the decoy support member by being connected to the decoy support member by a flexible line and wherein the powered actuator comprises a motor and a spool about which the flexible line is wound.

7. The decoy support of claim 1, further comprising a torsion spring resiliently biasing the decoy support member to a selected angular orientation about the axis of the upstanding post, wherein the powered actuator simultaneously compresses the compression spring and winds the torsion spring.

8. A decoy system comprising:
   a decoy;
   a ground support comprising a ground engaging portion and an upstanding linear post extending along an axis thereof from the ground engaging portion;
   a decoy support member movably guided by the upstanding linear post between a raised position and a lowered position, the decoy being supported and mounted to the decoy support member so as to be vertically movable therewith;
   a compression spring coaxial with the upstanding linear post, the compression spring resiliently biasing the decoy support member towards the raised position;
   a powered actuator coupled to the decoy support member to selectively compress the compression spring to lower the decoy support member vertically along the axis of the upstanding linear post while simultaneously rotating the decoy support member around the axis of the upstanding linear post; and
   a communications system having a receiver coupled to the powered actuator and a remote transmitter in communication with the receiver in a wired or wireless fashion, wherein signals transmitted from the remote transmitter to the receiver cause the powered actuator to selectively compress the compression spring.

9. The decoy system of claim 8, wherein the decoy is vertically movable through a distance of at least 4 inches.

10. The decoy system of claim 9, wherein the decoy is vertically movable through a maximum distance of 8 inches.

11. The decoy system of claim 8, wherein the upstanding post guides the decoy support member along an outer surface of the upstanding post which opposes an interior surface of the decoy.

12. The decoy system of claim 8, wherein compression of the compression spring by the powered actuator vertically lowers and simultaneously rotates the decoy support member in a first rotational direction around the axis of the upstanding linear post, the decoy support further comprising:

a second powered actuator coupled to the decoy support member to selectively compress the compression spring to lower the decoy support member vertically along the axis of the upstanding post while simultaneously rotating the decoy support member in a second rotational direction, opposite the first rotational direction, around the axis of the upstanding post.

13. The decoy system of claim 12, wherein the powered actuator and the second powered actuator are coupled to the decoy support member by being independently connected to the decoy support member by first and second flexible lines, respectively.

14. The decoy system of claim 8, wherein the powered actuator is coupled to the decoy support member so as to compress the compression spring to vertically lower the decoy support member along the axis of the upstanding post while maintaining an angular orientation of the decoy support member about the axis without rotating the decoy support member around the axis of the upstanding post after the decoy support member has reached the angular orientation about the axis of the upstanding post due to rotation of the decoy support member via the powered actuator.

15. The decoy system of claim 8, wherein the powered actuator is coupled to the decoy support member so as to rotate the decoy support member around the axis of the upstanding post while maintaining a height of the decoy support member without further compressing the compression spring and without further vertical lowering of the decoy support member when the decoy support member is at a lowest height defining the lowered position.

16. The decoy system of claim 8, wherein the powered actuator is coupled to the decoy support member by being connected to the decoy support member by a flexible line and wherein the powered actuator comprises a motor and a spool about which the flexible line is wound.

17. The decoy system of claim 8 further comprising a torsion spring resiliently biasing the decoy support member to a selected angular orientation about the axis of the upstanding post, wherein the powered actuator is to simultaneously compresses the compression spring and winds the torsion spring.

* * * * *